United States Patent
Li et al.

(10) Patent No.: US 8,508,632 B2
(45) Date of Patent: Aug. 13, 2013

(54) IMAGE PROCESSING METHOD OF OBTAINING A HIGH DYNAMIC RANGE IMAGE

(75) Inventors: Yun Chin Li, Taipei County (TW); Chan Min Chou, Taipei County (TW)

(73) Assignee: Altek Corporation, Hsinchu (TW)

( * ) Notice: Subject to any disclaimer, the term of this patent is extended or adjusted under 35 U.S.C. 154(b) by 459 days.

(21) Appl. No.: 12/905,684

(22) Filed: Oct. 15, 2010

(65) Prior Publication Data
US 2012/0092534 A1  Apr. 19, 2012

(51) Int. Cl.
*H04N 5/20* (2006.01)
*H04N 5/235* (2006.01)

(52) U.S. Cl.
USPC ...................................... 348/255; 348/229.1

(58) Field of Classification Search
None
See application file for complete search history.

(56) References Cited

U.S. PATENT DOCUMENTS

| | | | | |
|---|---|---|---|---|
| 5,828,793 | A * | 10/1998 | Mann | 382/284 |
| 7,940,311 | B2 * | 5/2011 | Trimeche et al. | 348/227.1 |
| 8,237,813 | B2 * | 8/2012 | Garten | 348/229.1 |
| 2011/0211732 | A1 * | 9/2011 | Rapaport | 382/107 |

* cited by examiner

*Primary Examiner* — Luong T Nguyen
(74) *Attorney, Agent, or Firm* — Morris Manning & Martin LLP; Tim Tingkang Xia, Esq.

(57) ABSTRACT

An image processing method, applicable to a digital image device, includes the following steps. At least one original image of different brightness ranges is captured, and more images of different brightness ranges are generated from the original image by using an image post-processing technique. Based on characteristics of the image of each brightness range, the weights of the image of each brightness range are defined. Then, hierarchical fusion is performed on the images of the different brightness ranges according to weight relations, so as to form a high-dynamic-range image capable of presenting features of each brightness range.

10 Claims, 11 Drawing Sheets

FIG.4D $$\begin{bmatrix} W_{B-1} & W_{G_b-1} \\ W_{G_b-1} & W_{B-1} \end{bmatrix} \longrightarrow A_{-1}$$

FIG.5A $$\begin{bmatrix} W_{B0} & W_{G_b0} \\ W_{G_b0} & W_{B0} \end{bmatrix} \longrightarrow A_0$$

FIG.5B $$\begin{bmatrix} W_{B1} & W_{G_b1} \\ W_{G_b1} & W_{B1} \end{bmatrix} \longrightarrow A_1$$

IMAGE PROCESSING METHOD OF OBTAINING A HIGH DYNAMIC RANGE IMAGE

BACKGROUND OF THE INVENTION

1. Field of the Invention

The present invention relates to an image processing method, and more particularly to a method of performing brightness feature mixing and hierarchical combination on an original image, so as to obtain a high-dynamic-range image.

2. Related Art

With the rapid development of technologies and improvement of living standard of modern people, digital image devices, for example, digital still cameras, increasingly become indispensable in people's lives. Due to advanced researching and developing techniques, the digital still camera is also developed rapidly and becomes the mainstream of the market.

Figure 1A:
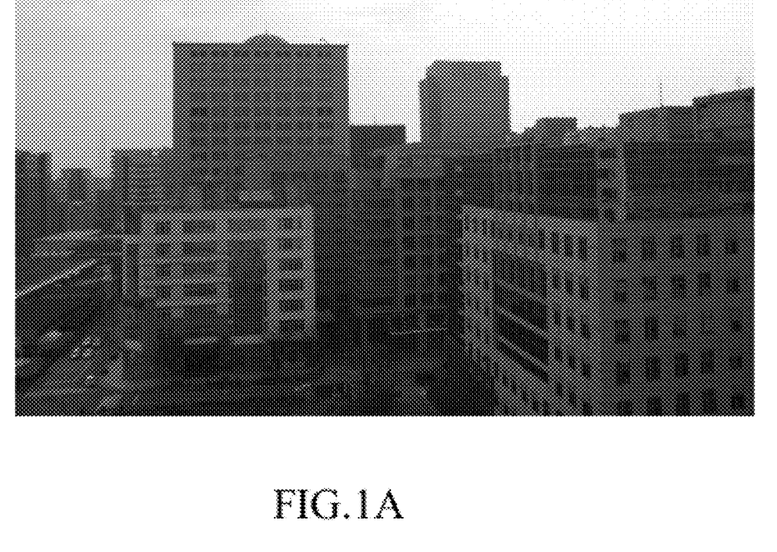
FIG. 1A shows an image picture presented by a conventional image sensor when receiving a high-contrast scene.

Taking the digital still camera for example, when a captured image has a high-contrast scene (for example, both the sunny sky and the buildings in the shadow are present in the scene), due to output limits of software and hardware of the digital still camera, most of the scene in the dynamic range is sacrificed, and the dynamic range of the entire scene cannot be reserved completely as its original appearance. That is to say, as shown in FIG. 1A, the high-bright region (for example, the cloud in the sky) and the low-bright region (for example, the buildings in the lower part) of the image are quite dim in the imaged picture, and it is rather difficult to present the two regions in one picture without distortion.

Recently, in the prior art, a conventional method is to change the output tone mapping according to the brightness distribution of the shot scene. However, the effect of this method is quite limited. Besides, the problems of unnatural colors and excessive artifact are also caused. In addition, when the digital still camera continuously shoots several pictures, as the pictures are continuously shot and the time intervals of shooting are quite short, it is impossible to combine several pictures in a tone mapping manner when the pictures are continuously shot for the same scene in the prior art. Therefore, through the conventional method, the picture without artifact cannot be effectively obtained, and the operation of the user becomes more inconvenient.

SUMMARY OF THE INVENTION

Accordingly, the present invention is an image processing method, capable of processing an original image captured by an image sensor, thereby effectively reserving brightness features of the original image, and preventing artifact, color dynamic distortion, and other negative effects, so as to solve the above problems.

The present invention provides an image processing method, applicable to a digital image device. The image processing method comprises the following steps.

An original image is captured. A high-bright image, a medium-bright image, and a low-bright image are obtained from the original image. A high-bright weight array, a medium-bright weight array, and a low-bright weight array are determined according to the high-bright image, the medium-bright image, and the low-bright image. A high-dynamic-range image is obtained according to the high-bright image, the medium-bright image, the low-bright image, the high-bright weight array, the medium-bright weight array, and the low-bright weight array.

Therefore, in the image processing method of the present invention, the high-bright image, the medium-bright image, and the low-bright image corresponding to different brightness features are obtained from the original image, the individual relative weights are determined through an edge detection procedure or a brightness determination procedure, and finally the high-dynamic-range image in which the different brightness features are fused is obtained through a weight aggregation method.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

Figure 1B:
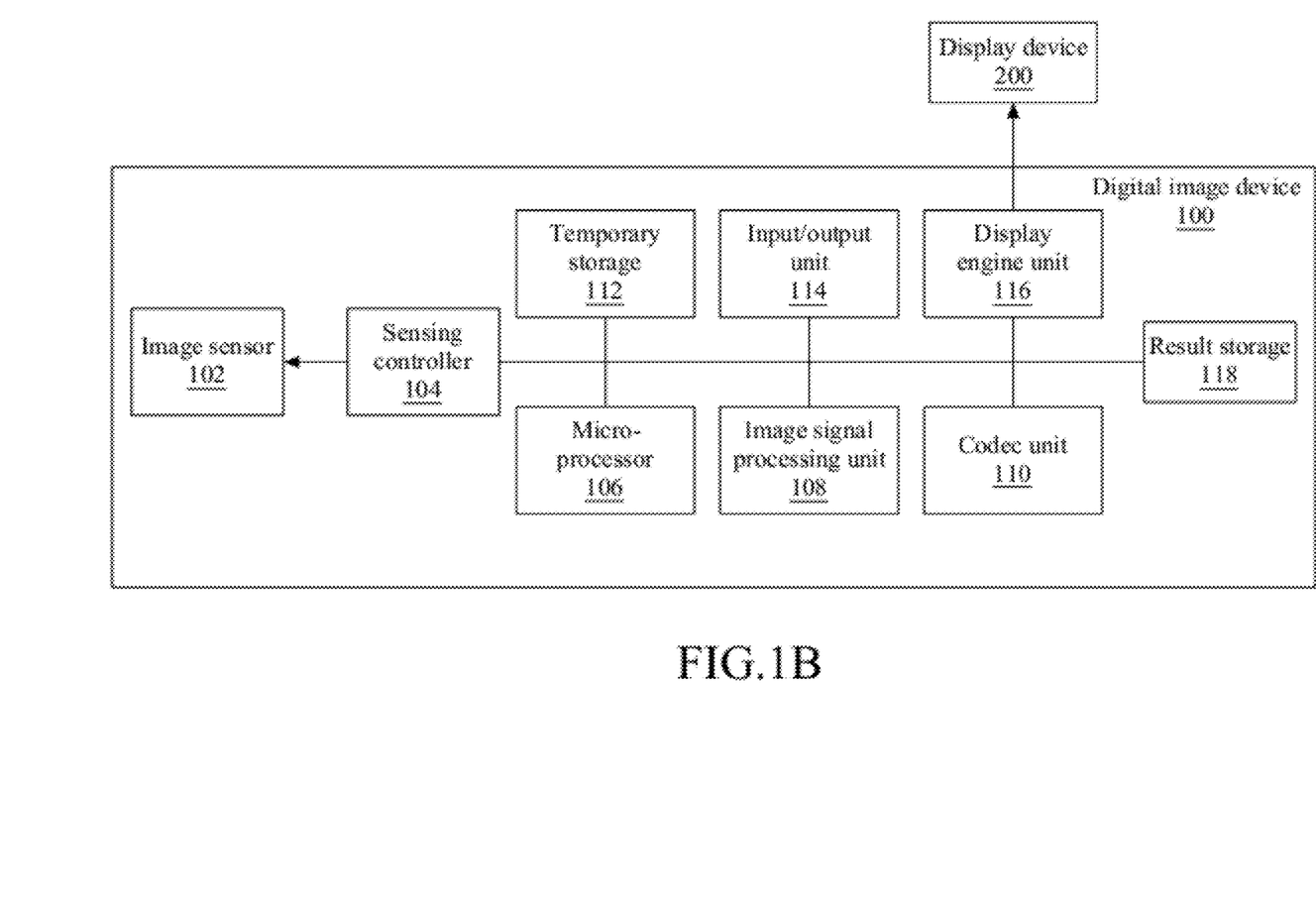
FIG. 1B is a schematic structural view of a digital image device according to an embodiment of the present invention.

FIG. 1B is a schematic structural view of a digital image device according to an embodiment of the present invention. The digital image device 100 may be a digital still camera, a digital video camera, a webcamcorder, or other electronic products having a digital image capturing function integrated therein, for example, a cell phone or a personal digital assistant (PDA). The digital image device 100 comprises an image sensor 102, a sensing controller 104, a micro-processor 106, an image signal processing unit 108, a codec unit 110, a temporary storage 112, an input/output unit 114, a display engine unit 116, and a result storage 118. Through partition processing of each element (as described above) of the digital image device 100, an image is displayed on a display device 200. The image sensor 102 according to the embodiment of the present invention is, for example, an image sensor of a digital still camera, but the present invention is not limited thereto. The common image sensor 102 may be, but is not limited to, a charge-coupled device (CCD).

The image sensor 102 has a plurality of sensing pixels, for receiving lights transmitted from a scene, and converting the scene to corresponding image data through photoelectric conversion. In order to obtain a color sensing effect, a plurality of neighboring sensing pixels is grouped to form a filtering pattern. The filtering pattern may be, but is not limited to, a Bayer pattern. In the embodiment of the present invention, the Bayer pattern is used as the filtering pattern, but other types of patterns may also be used to implement the present invention.

Figure 2:
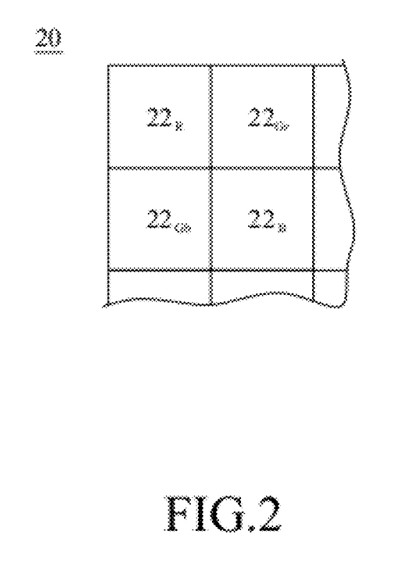
FIG. 2 is a schematic view of a Bayer pattern according to an embodiment of the present invention.

For example, in FIG. 2, every four neighboring sensing pixels $22_R$, $22_{Gr}$, $22_{Gb}$, and $22_B$ form a Bayer pattern 20. The digital image device 100 receives the lights transmitted from the scene through the sensing pixels $22_R$, $22_{Gr}$, $22_{Gb}$, and $22_B$ in each Bayer pattern 20, and captures a corresponding original image through photoelectric conversion. For ease of subsequent description, the single Bayer pattern 20 in the original image is used for subsequent explanation and description.

According to an embodiment of the present invention, the sensing pixels $22_R$, $22_{Gr}$, $22_{Gb}$, and $22_B$ respectively have 14 bits, but the present invention is not limited thereto, and the sensing pixel may have 12 bits, 10 bits, and 16 bits depending on different image sensors 102. In the following, the sensing pixel has 14 bits for description.

Figure 3A:
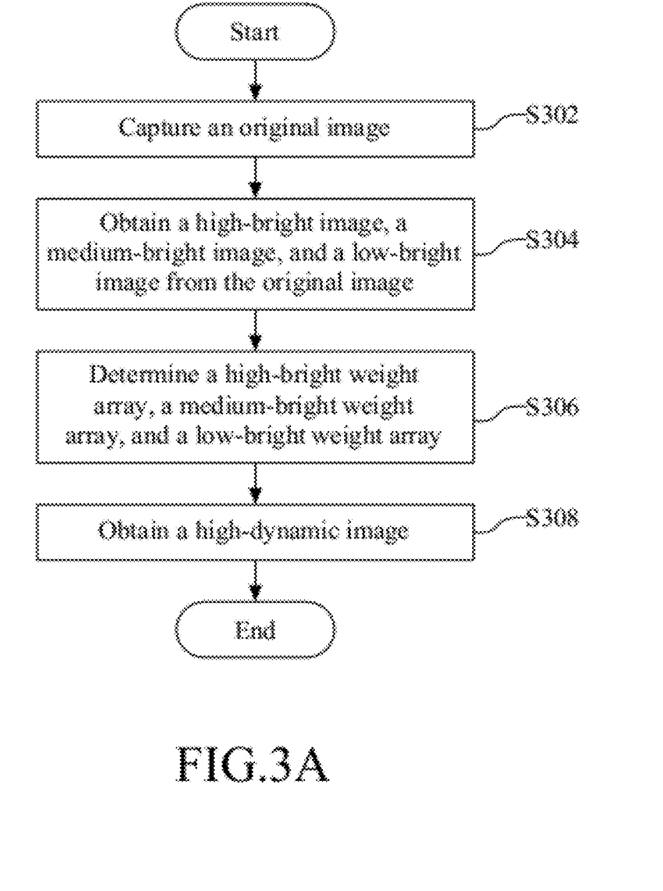
FIG. 3A is a flow chart of an embodiment of the present invention.

FIG. 3A is a flow chart of an image processing method according to an embodiment of the present invention. The image processing method is applicable to the digital image device 100, in which the image sensor 102 has a plurality of sensing pixels $22_R$, $22_{Gr}$, $22_{Gb}$, and $22_B$ in a Bayer pattern 20, converts the lights transmitted from a scene through the sensing pixels $22_R$, $22_{Gr}$, $22_{Gb}$, and $22_B$, and captures an original image. The image processing method comprises the following steps.

In Step S302, an original image is captured.

In Step S304, a high-bright image, a medium-bright image, and a low-bright image are obtained from the original image.

In Step S306, a high-bright weight array, a medium-bright weight array, and a low-bright weight array are determined according to the high-bright image, the medium-bright image, and the low-bright image.

In Step S308, a high-dynamic-range image is obtained according to the high-bright image, the medium-bright image, the low-bright image, the high-bright weight array, the medium-bright weight array, and the low-bright weight array. Steps S302 to S308 are executed by the micro-processor 106 in FIG. 1B.

Figure 4A:
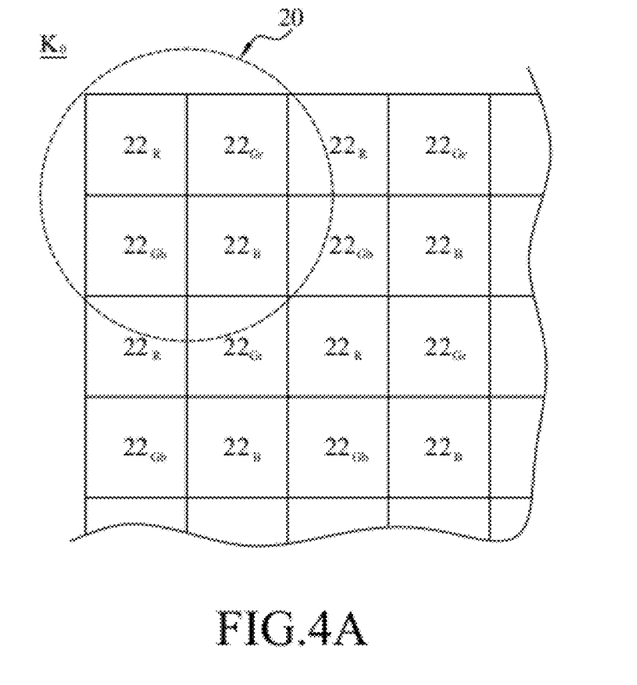
FIG. 4A is a schematic view of an original image in a single Bayer pattern according to an embodiment of the present invention.

For Step S304, reference can be made to FIGS. 4A to 4D, which are schematic views of a high-bright image, a medium-bright image, and a low-bright image obtained from the original image. Referring to FIG. 4A, the sensing pixels $22_R$, $22_{Gr}$, $22_{Gb}$, and $22_B$ respectively have 14 bits, and in Step S304, a bit filtering procedure is executed, so as to obtain the high-bright image $S_{-1}$ of FIG. 4B, the medium-bright image $S_0$ of FIG. 4C, and the low-bright image $S_1$ of FIG. 4D from the original image $K_0$. For example, the sensing pixels $22_R$, $22_{Gr}$, $22_{Gb}$, and $22_B$ respectively have 14 bits, and the bit filtering procedure comprises obtaining the medium-bright image $S_0$ from a medium bit interval in each sensing pixel of the original image $K_0$, obtaining the high-bright image $S_{-1}$ from a high bit interval in each sensing pixel of the original image $K_0$, and obtaining the low-bright image $S_1$ from a low bit interval in each sensing pixel of the original image $K_0$.

The medium bit interval may be set as the $2^{nd}$ to $9^{th}$ bits in the 14 bits of each sensing pixel, the high bit interval may be set as the $3^{rd}$ to $10^{th}$ bits in the 14 bits of each sensing pixel, and the low bit interval may be set as the $1^{st}$ to $8^{th}$ bits in the 14 bits of each sensing pixel. The intervals of the sampled bits are different, such that the high-bright image $S_{-1}$, the medium-bright image $S_0$, and the low-bright image $S_1$ may respectively reserve features of a brighter region, features of a medium-bright region, and features of a darker region of the original image $K_0$. However, the above bit sampling ranges of the medium bit interval, the high bit interval, and the low bit interval are only examples, and are not intended to limit the scope of the present invention. Further, the number of the images that respectively reserve different brightness ranges of the original image $K_0$ may be determined according to actual demands, and is not limited to three.

Figure 4B:
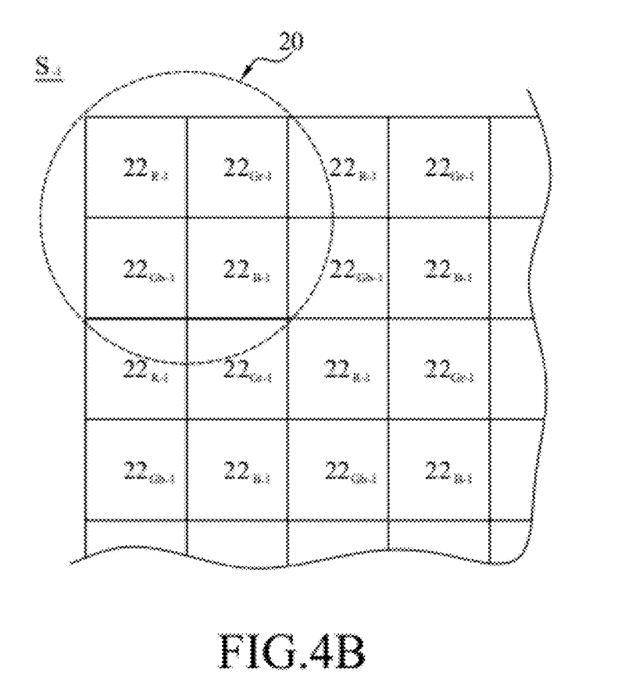
FIG. 4B is a schematic view of a high-bright image in a single Bayer pattern according to an embodiment of the present invention.
Figure 4C:
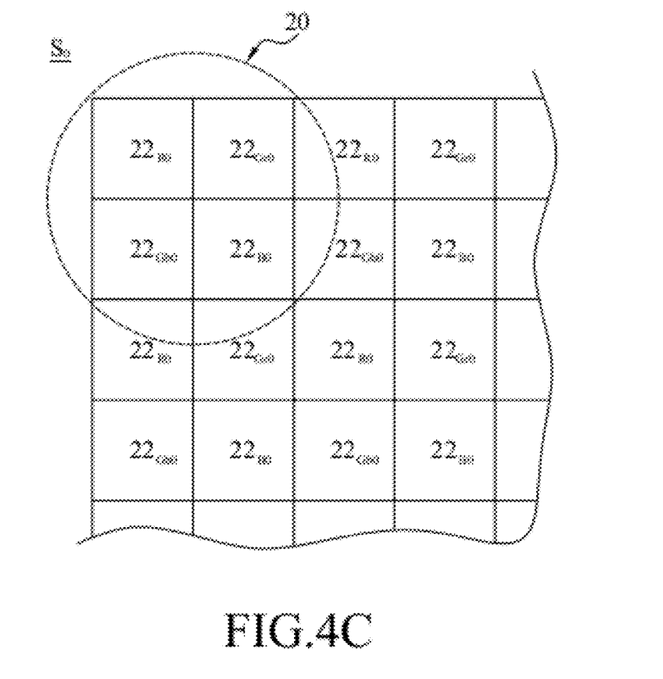
FIG. 4C is a schematic view of a medium-bright image in a single Bayer pattern according to an embodiment of the present invention.
Figure 4D:
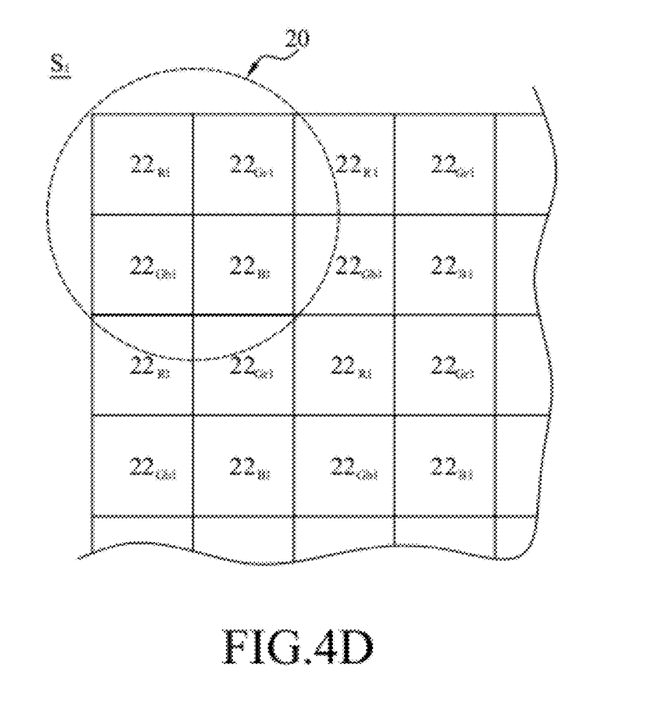
FIG. 4D is a schematic view of a low-bright image in a single Bayer pattern according to an embodiment of the present invention.

Specifically, in the high-bright image $S_{-1}$, most of the features of the high-bright region are reserved, but the features of the low-bright region are sacrificed. Similarly, in the low-bright image $S_1$, most of the features of the low-bright region are reserved, but the features of the high-bright region are sacrificed. In the medium-bright image $S_0$, the features of the relatively medium-bright region in the original image are reserved, but the brightness values out of the region are sacrificed. It should be noted herein that the medium bit interval, the high bit interval, and the low bit interval are not limited, and the bit interval of the sampled sensing pixel is determined according to the image to be presented by the digital image device 100. Besides, in the bit filtering procedure, an imaging sequence of the high-bright image $S_{-1}$, the medium-bright image $S_0$, and the low-bright image $S_1$ is not limited to a precedence order.

Referring to FIGS. 4B to 4D, the high-bright image $S_{-1}$, the medium-bright image $S_0$, and the low-bright image $S_1$ are the image data obtained from the original image $K_0$ after the bit filtering procedure is executed, such that the high-bright image $S_{-1}$, the medium-bright image $S_0$, and the low-bright image $S_1$ respectively have sensing pixels $22_{R-1}$, $22_{Gr-1}$, $22_{Gb-1}$, and $22_{B-1}$, sensing pixels $22_{R0}$, $22_{Gr0}$, $22_{Gb0}$, and $22_{B0}$, and sensing pixels $22_{R1}$, $22_{Gr1}$, $22_{Gb1}$, and $22_{B1}$ in the same Bayer pattern 20.

Figure 5A:
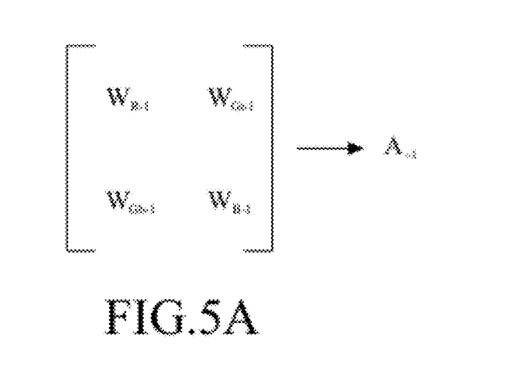
FIG. 5A is a schematic view of a high-bright weight array according to an embodiment of the present invention.
Figure 5B:
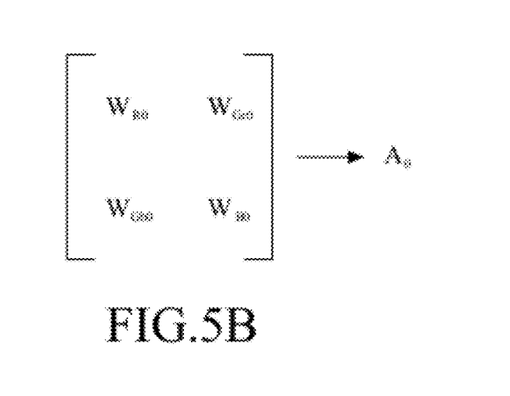
FIG. 5B is a schematic view of a medium-bright weight array according to an embodiment of the present invention.
Figure 5C:
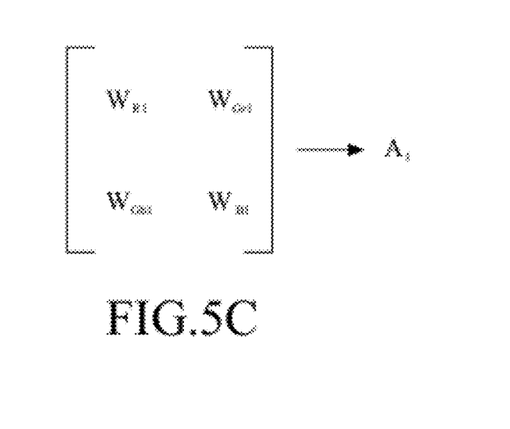
FIG. 5C is a schematic view of a low-bright weight array according to an embodiment of the present invention.

For Step S306, for example, when comparing the same optical filter (taking the red light as an example) of the high-bright image $S_{-1}$ the medium-bright image $S_0$, and the low-bright image $S_1$ in the same Bayer pattern 20, the sensing pixels $22_{R-1}$, $22_{R0}$, and $22_{R1}$ respectively have edge values $E_{R-1}$, $E_{R0}$, and $E_{R1}$ corresponding to the high-bright image $S_{-1}$, the medium-bright image $S_0$, and the low-bright image $S_1$. Therefore, when the sensing pixels $22_{R-1}$, $22_{R0}$, and $22_{R1}$ are combined, each relative weight $W_{R-1}$, $W_{R0}$, and $W_{R1}$ may be Error! Objects cannot be created from editing field codes, Error! Objects cannot be created from editing field codes, and Error! Objects cannot be created from editing field codes. Similarly, the sensing pixels $22_{Gr-1}$, $22_{Gr0}$, and $22_{Gr1}$, the sensing pixels $22_{Gb-1}$, $22_{Gb0}$, and $22_{Gb1}$, and the sensing pixels $22_{B-1}$, $22_{B0}$, and $22_{B1}$ have edge values $E_{Gr-1}$, $E_{Gr0}$, and $E_{Gr1}$, edge values $E_{Gb-1}$, $E_{Gb0}$, and $E_{Gb1}$, and edge values $E_{B-1}$, $E_{B0}$, and $E_{B1}$ corresponding to the high-bright image $S_{-1}$, the medium-bright image $S_0$, and the low-bright image $S_{-1}$, respectively. Therefore, when comparing the same Bayer pattern 20 of the high-bright image $S_{-1}$, the medium-bright image $S_0$, and the low-bright image $S_1$, a high-bright weight array $A_{-1}$ corresponding to the high-bright image $S_{-1}$, a medium-bright weight array $A_0$ corresponding to the medium-bright image $S_0$, and a low-bright weight array $A_1$ corresponding to the low-bright image $S_1$ are determined through the edge detection procedure. The high-bright weight array $A_{-1}$, the medium-bright weight array $A_0$, and the low-bright weight array $A_1$ are respectively as shown in FIGS. 5A to 5C.

The high-bright image $S_{-1}$, the medium-bright image $S_0$, and the low-bright image $S_1$ respectively reserve the features of the brighter region, the medium-bright region, and the darker region of the original image $K_0$, and the respective corresponding weight arrays may also be determined through the edge detection procedure. Therefore, in Step 308, a high-dynamic-range image after fusion is calculated through a weight aggregation method, that is, a product of the high-bright image $S_{-1}$ multiplied by the high-bright weight array $A_{-1}$, plus a product of the medium-bright image $S_0$ multiplied by the medium-bright weight array $A_0$, and plus a product of the low-bright image $S_1$ multiplied by the low-bright weight array $A_1$, representing the high-dynamic-range image displayed on the display device 200 of FIG. 1B.

Besides, according to another embodiment of the present invention, the manner of determining the high-bright weight array $A_{-1}$, the medium-bright weight array $A_0$, and the low-bright weight array $A_1$ in Step S306 is not limited to the edge detection procedure, and may also be a brightness determination procedure or a chromaticity determination procedure.

To sum up, through the image processing method according to the embodiment of the present invention, the image data corresponding to different brightness features is obtained from the original image, then the relative weights of each image data are determined through the edge detection procedure, the brightness determination procedure, or the chromaticity determination procedure, and finally the high-dynamic-range image in which the different brightness features are fused is obtained through the weight aggregation method.

In addition, in order to make the colors of the eventually output high-dynamic-range image more natural and remove excessive artifacts, in the image processing method according to the embodiment of the present invention. Step S308 may be implemented through the embodiment below.

Second Embodiment of Step S308

Figure 3B:
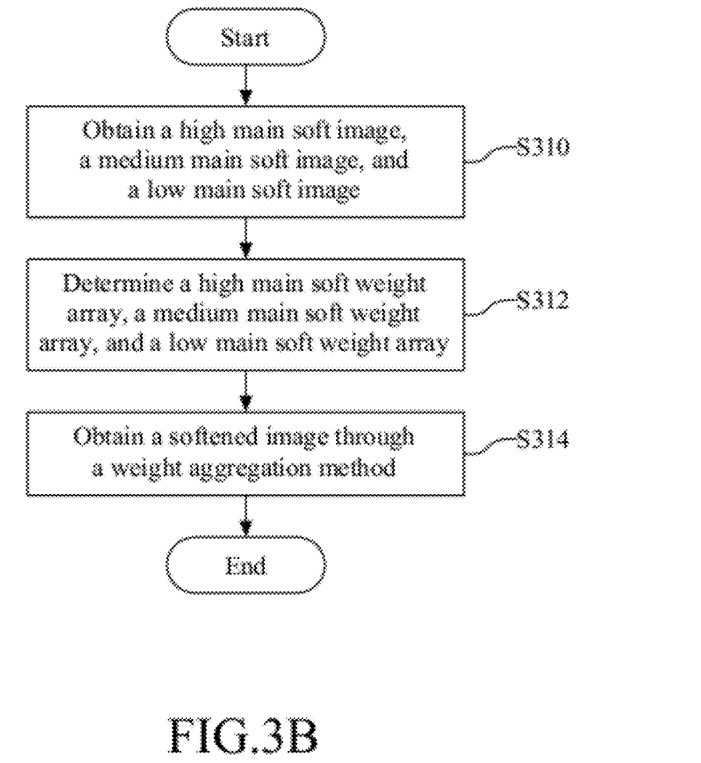
FIG. 3B is a flow chart of a second embodiment of Step S308 according to the present invention.

FIG. 3B is a flow chart of a second embodiment of Step S308 according to the present invention. The high-bright image $S_{-1}$, the medium-bright image $S_0$, and the low-bright image $S_1$ are image data in which the sensing pixel has corresponding 8 bits, such that the micro-processor 106 in FIG. 1B may perform a hierarchical procedure on the high-bright image $S_{-1}$, the medium-bright image $S_0$, and the low-bright image $S_1$, as shown in Step S310, so as to obtain a high main soft image $M_{-1}$ corresponding to the high-bright image $S_{-1}$, a medium main soft image $M_0$ corresponding to the medium-bright image $S_0$, and a low main soft image $M_1$ corresponding to the low-bright image $S_1$.

Figure 6A:
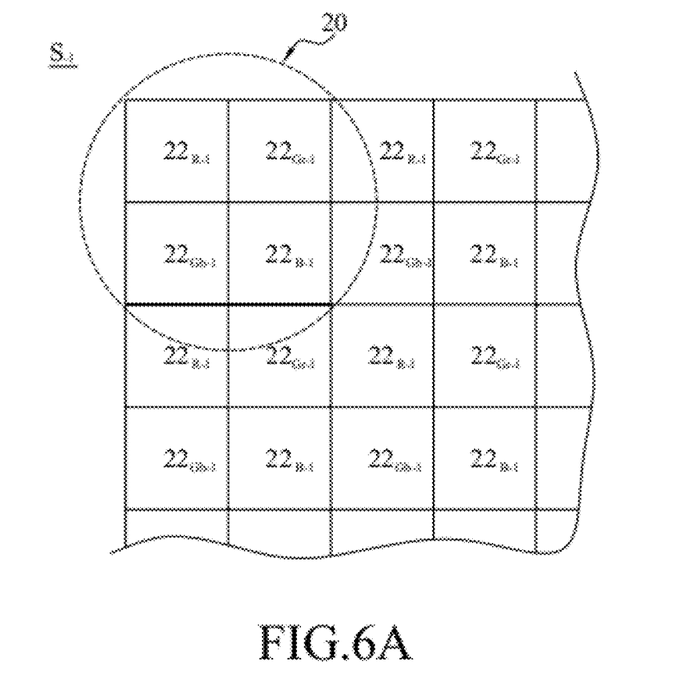
FIG. 6A is a schematic view of a high-bright image in a single Bayer pattern according to an embodiment of the present invention.
Figure 6B:
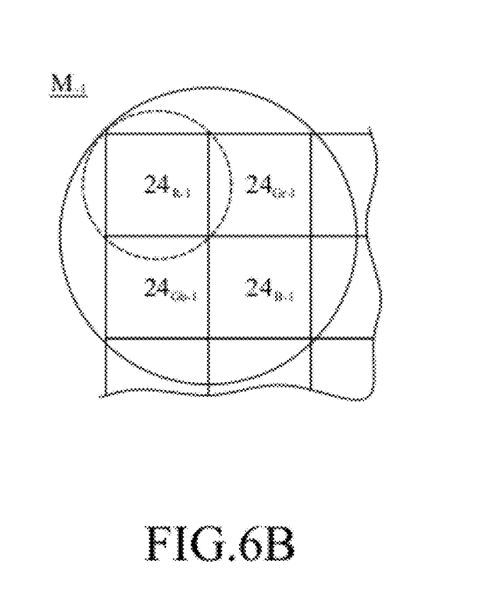
FIG. 6B is a schematic view of a high main soft image in a single Bayer pattern according to an embodiment of the present invention.

Referring to FIGS. 6A and 6B, for example, for the high main soft image $M_{-1}$, in the hierarchical procedure of Step S310, preferably, a processing procedure (for example, interpolation) is performed on the same optical filter (taking the red light as an example) in each Bayer pattern 20 in the high-bright image $S_{-1}$, so as to form a single color optical sensing pixel $24_{R-1}$. Then, it is deduced through the same method to acquire the remaining sensing pixels $24_{Gr-1}$, $24_{Gb-1}$, and $24_{B-1}$ after the hierarchical procedure is executed, so as to obtain the high main soft image $M_{-1}$ close to the original high-bright image $S_{-1}$. Further, through the same method, the medium main soft image $M_0$ is obtained from the medium-bright image $S_0$, and the low main soft image $M_1$ is obtained from the low-bright image $S_1$. Therefore, for example, when a resolution of the image data of the high-bright image $S_{-1}$, the medium-bright image $S_0$, and the low-bright image $S_1$ is 8 M pixels, the high main soft image $M_{-1}$, the medium main soft image $M_0$, and the low main soft image $M_1$ are 2 M pixels.

Figure 6C:
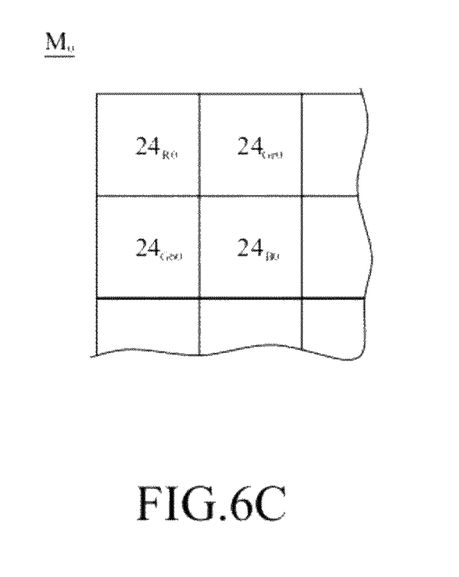
FIG. 6C is a schematic view of a medium main soft image in a single Bayer pattern according to an embodiment of the present invention.
Figure 6D:
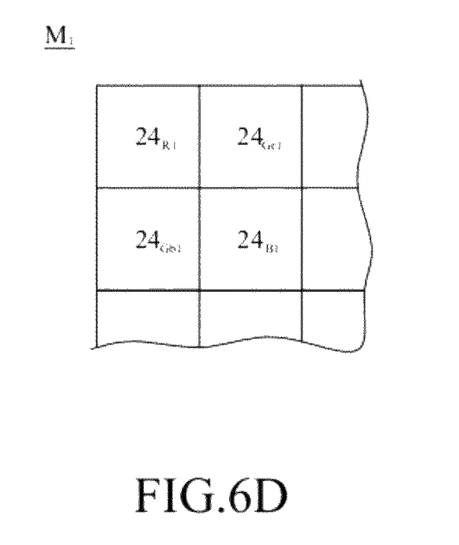
FIG. 6D is a schematic view of a low main soft image in a single Bayer pattern according to an embodiment of the present invention.

For Step S312, as shown in FIGS. 6B to 6D, a high main soft weight array, a medium main soft weight array, and a low main soft weight array are determined through the edge detection procedure, the brightness determination procedure, or the chromaticity determination procedure according to the high main soft image $M_{-1}$, the medium main soft image $M_0$, and the low main soft image $M_1$. Next, as shown in Step S314, a softened image that is magnified to have the image data of 8 M pixels is obtained through the weight aggregation method after the micro-processor 106 corrects the sensing pixels of each point.

Figure 3C:
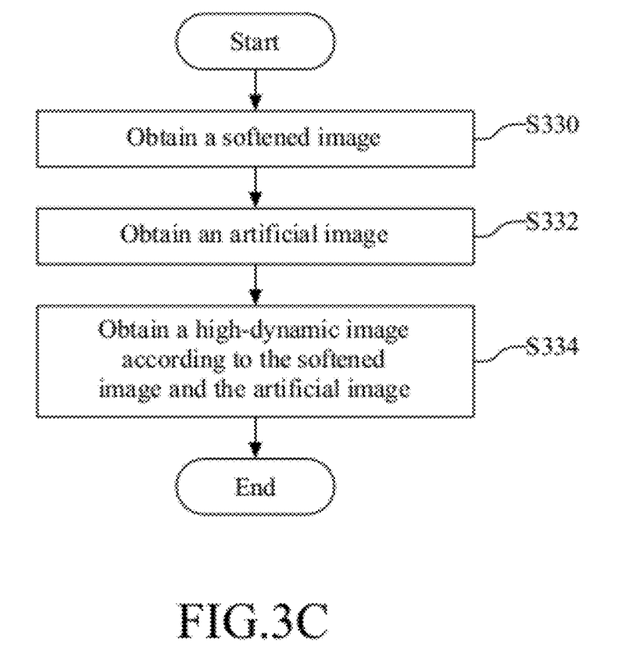
FIG. 3C is a flow chart of FIG. 3B.

As shown in the flow chart of FIG. 3C, the softened image is then compared with an artificial image through the edge detection procedure, the brightness determination procedure, or the chromaticity determination procedure, the respective corresponding weight proportion is obtained, and the output high-dynamic-range image is eventually obtained through the weight aggregation method. The artificial image is the image data generated after the weight aggregation method is performed on the high-bright image $S_{-1}$, the medium-bright image $S_0$, the low-bright image $S_1$, the high-bright weight array $A_{-1}$, the medium-bright weight array $A_0$, and the low-bright weight array $A_1$ before the hierarchical procedure is executed.

Therefore, in the image processing method of the present invention, according to the foregoing embodiment, the hierarchical combining procedure is implemented, but the present invention is not limited to the manner of the embodiment. During the image processing procedure, the designer may determine the quantity of the hierarchies to be combined and the image data, so as to obtain the image data having a higher dynamic-range range, closer to the real chromaticity, and capable of being effectively removed of artifact after the hierarchical fusion.

What is claimed is:

1. An image processing method, comprising steps of:
    capturing an original image;
    obtaining a high-bright image, a medium-bright image, and a low-bright image from the original image;
    determining a high-bright weight array, a medium-bright weight array, and a low-bright weight array according to the high-bright image, the medium-bright image, and the low-bright image; and
    obtaining a high-dynamic-range image according to the high-bright image, the medium-bright image, the low-bright image, the high-bright weight array, the medium-bright weight array, and the low-bright weight array,
    wherein the step of determining the high-bright weight array, the medium-bright weight array, and the low-bright weight array comprises executing an edge detection procedure, so as to obtain the high-bright weight array, the medium-bright weight array, and the low-bright weight array from the high-bright image, the medium-bright image, and the low-bright image.

2. The image processing method according to claim 1, wherein the step of obtaining the high-bright image, the medium-bright image, and the low-bright image from the original image comprises executing a bit filtering procedure, so as to obtain the high-bright image, the medium-bright image, and the low-bright image from the original image.

3. The image processing method according to claim 2, wherein the bit filtering procedure comprises:
- obtaining the medium-bright image from a medium bit interval of the original image;
- obtaining the high-bright image from a high bit interval of the original image; and
- obtaining the low-bright image from a low bit interval of the original image.

4. The image processing method according to claim 1, wherein the step of obtaining the high-dynamic-range image according to the high-bright image, the medium-bright image, the low-bright image, the high-bright weight array, the medium-bright weight array, and the low-bright weight array comprises obtaining the high-dynamic-range image through a weight aggregation method.

5. An image processing method, comprising steps of:
- capturing an original image;
- obtaining a high-bright image, a medium-bright image, and a low-bright image from the original image;
- determining a high-bright weight array, a medium-bright weight array, and a low-bright weight array according to the high-bright image, the medium-bright image, and the low-bright image; and
- obtaining a high-dynamic-range image according to the high-bright image, the medium-bright image, the low-bright image, the high-bright weight array, the medium-bright weight array, and the low-bright weight array, wherein the step of obtaining the high-dynamic-range image according to the high-bright image, the medium-bright image, the low-bright image, the high-bright weight array, the medium-bright weight array, and the low-bright weight array further comprises steps of:
- executing a hierarchical procedure according to the high-bright image, the medium-bright image, and the low-bright image, so as to obtain a softened image;
- obtaining an artificial image according to the high-bright image, the medium-bright image, the low-bright image, the high-bright weight array, the medium-bright weight array, and the low-bright weight array; and
- obtaining the high-dynamic-range image according to the softened image and the artificial image.

6. The image processing method according to claim 5, wherein the step of executing the hierarchical procedure according to the high-bright image, the medium-bright image, and the low-bright image, so as to obtain the softened image comprises:
- obtaining a high main soft image, a medium main soft image, and a low main soft image according to the high-bright image, the medium-bright image, and the low-bright image;
- determining a high main soft weight array, a medium main soft weight array, and a low main soft weight array according to the high main soft image, the medium main soft image, and the low main soft image; and
- obtaining the softened image through a weight aggregation method according to the high main soft image, the medium main soft image, the low main soft image, the high main soft weight array, the medium main soft weight array, and the low main soft weight array.

7. The image processing method according to claim 5, wherein the step of obtaining the high-bright image, the medium-bright image, and the low-bright image from the original image comprises executing a bit filtering procedure, so as to obtain the high-bright image, the medium-bright image, and the low-bright image from the original image.

8. The image processing method according to claim 7, wherein the bit filtering procedure comprises:
- obtaining the medium-bright image from a medium bit interval of the original image;
- obtaining the high-bright image from a high bit interval of the original image; and
- obtaining the low-bright image from a low bit interval of the original image.

9. The image processing method according to claim 5, wherein the step of determining the high-bright weight array, the medium-bright weight array, and the low-bright weight array comprises executing an edge detection procedure, so as to obtain the high-bright weight array, the medium-bright weight array, and the low-bright weight array from the high-bright image, the medium-bright image, and the low-bright image.

10. The image processing method according to claim 5, wherein the step of determining the high-bright weight array, the medium-bright weight array, and the low-bright weight array comprises executing a brightness determination procedure, so as to obtain the high-bright weight array, the medium-bright weight array, and the low-bright weight array from the high-bright image, the medium-bright image, and the low-bright image.

* * * * *